United States Patent [19]
Buzby, Jr. et al.

[11] 3,920,687
[45] Nov. 18, 1975

[54] 2,3,6,7-TETRAHYDRO-6-PHENYL-5H-IMIDAZO[1,2-D][1,4]BENZODIAZEPIN-5-ONES AND DIAZEPINES

[75] Inventors: George C. Buzby, Jr., Philadelphia; Harshavedan C. Shah, Secane, both of Pa.

[73] Assignee: American Home Products Corporation, New York, N.Y.

[22] Filed: Sept. 9, 1974

[21] Appl. No.: 504,408

[52] U.S. Cl............................... 260/309.6; 424/273
[51] Int. Cl.². ...................................... C07D 49/34
[58] Field of Search ............................ 260/309.6

[56] References Cited
UNITED STATES PATENTS
3,523,947   8/1970   Derieg et al. .................... 260/309.6

OTHER PUBLICATIONS
Chem. Abstracts, 73:25542y.

Primary Examiner—Ethel G. Love
Attorney, Agent, or Firm—Richard K. Jackson

[57] ABSTRACT
Compounds of the formula:

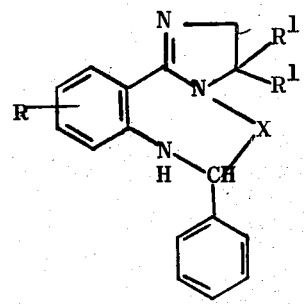

in which

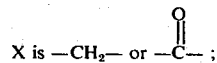

X is $-CH_2-$ or $-\overset{O}{\underset{\|}{C}}-$;

R is $-H$ or $-Cl$;
$R^1$ is $-H$ or $-CH_3$; and pharmaceutically acceptable acid addition salts thereof possess central nervous system activity and additionally, the 1,4-benzodiazepine form of the compounds exhibit antagonism of reserpine induced ptosis of the eyelid in standard experimental animals.

8 Claims, No Drawings

2,3,6,7-TETRAHYDRO-6-PHENYL-5H-IMIDAZO[1,2-D][1,4]BENZODIAZEPIN-5-ONES AND DIAZEPINES

DESCRIPTION OF THE INVENTION

In accordance with this invention there is provided a group of central nervous system depressants useful in inducing a sedative response in warm-blooded animals, which depressants present the structural formula:

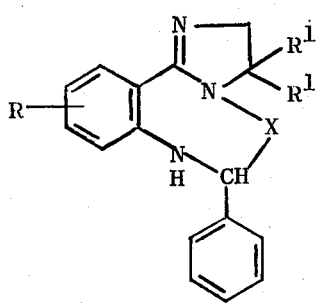

in which

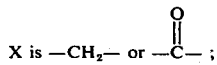

R is —H or —Cl;
R¹ is —H or —CH₃; and
pharmaceutically acceptable acid addition salts thereof.

The compounds of this invention are prepared by condensing an imidazo aniline with an alpha halophenylacetic acid halide followed by ring closure under basic conditions and chemical reduction of the resulting ketone. The imidazo aniline starting materials are produced by condensing methyl anthranilate or an appropriately ring substituted derivative thereof, with an aromatic sulfonylchloride such as p-methoxy benzene sulfonyl chloride followed by reaction with 1,2-diamino-2-methyl propane or 1,2-diamino ethane to obtain the corresponding 2-imidazolin-2-yl-N-(4-methoxybenzenesulfonyl)aniline derivatives which are desulfonylated to afford the 2-imidazol-2-yl aniline precursors. The preparation of the imidazo aniline precursors is exemplified as follows:

Dissolve 15 grams of methyl anthranilate in pyridine (15 milliliters) and benzene (100 milliliters) and add a stoichiometric amount of p-methoxybenzenesulfonyl chloride. After standing for 4 hours the precipitate is removed by filtration, washed with benzene and the filtrate evaporated to dryness. Recrystallization of the residue gave methyl o-(4-aminobenzenesulfonamido) benzoate (25.0 grams, melting range 81°–85°C.). Reflux the product (5.0 grams) overnight with 1,2-diamino-2-methyl propane (50 milliliters). Remove the excess diamine under vacuum and heat the residue at 170°–190°C. on an oil bath stripping at 0.5 millimeters Hg vacuum. The solidified contents of the flask is recrystallized from ethanol-benzene to provide 2'[4,4(or 5,5)dimethyl-2-imidazolin-2-yl]-4-methoxy benzene sulfonanilide (5.475 grams, melting range 202°–205°C.) which is desulfonylated by heating on a steam bath overnight with 92 percent $H_2SO_4$ (102 milliliters concentrated $H_2SO_4$ plus 12 milliliters $H_2O$) followed by cooling and pouring the product into ice water containing excess $NH_4OH$. Extract with methylene chloride, dry and remove the solvent to obtain o-[4,4 (or 5,5)dimethyl-2-imidazolin-2-yl]aniline. The corresponding imidazo aniline precursor devoid of gem-dimethyl groups is made in the same way by employing 1,2-diamino ethane as the reactant. Likewise, benzene sulfonyl chlorides in general may be employed in lieu of the p-methoxybenzene sulfonyl chloride specifically employed herein.

The imidazo aniline precursors

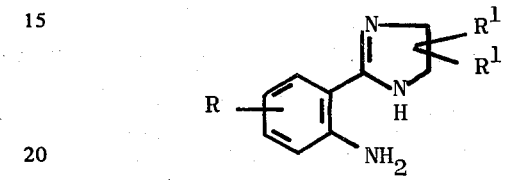

condense with the alpha halophenylacetyl halides

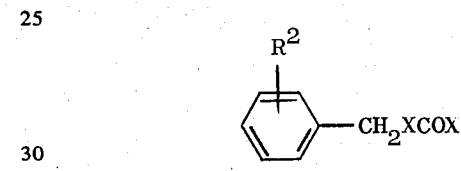

smoothly in an inert organic solvent or diluent such as methylene chloride, to provide an open amide of the formula:

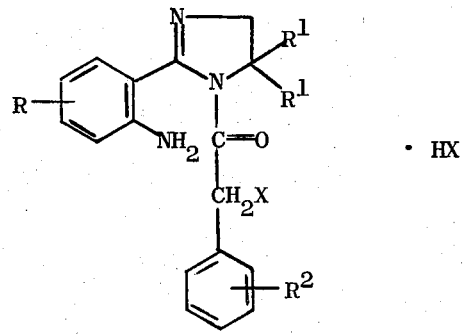

which ring close under basic conditions to provide the 1,4-benzodiazepin-5-ones

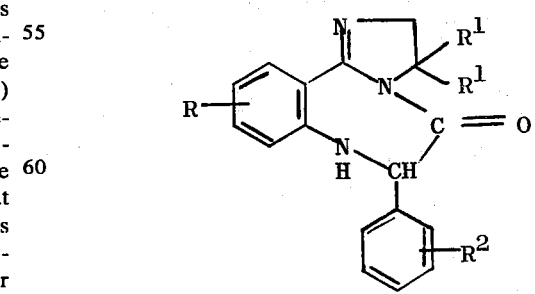

which undergo chemical reduction with reagents such as $LiAlH_4$ to afford the benzodiazepine structure

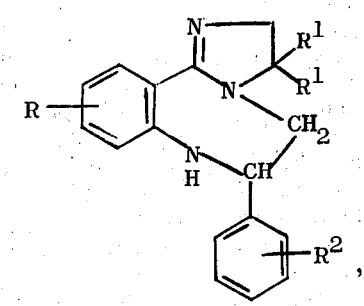

$R^2$ being —H, halogen, alkyl, alkoxy, —$CF_3$, —$NO_2$, $NH_2$, and the like.

The compounds of this invention are central nervous system depressants. They present an activity profile consistent with a sedative or tranquilizer in the standard experimental animal. The compounds are useful in eliciting a calming effect in warm-blooded animals. In addition to their central nervous system depressant activity, the 1,4-benzodiazepines of this invention produce antagonism toward reserpine induced ptosis in the mouse. Based upon that activity and their sedating properties, the 1,4-benzodiazepines of this invention are catagorized as possessing both central nervous system depressant activity and thymoleptic activity and are useful as sedatives and mood elevators.

The central nervous system depressant activity of the compounds of this invention was determined in vivo by administering each of the compounds orally to three mice weighing from 14 to 24 grams at each of the dosage levels 400, 127, 40, 12.7, 4.0 and 1.27 milligrams per kilogram body weight. The mice were observed for at least 2 hours to determine the effect of the compound. With the compounds of this invention, the observations included some signs of stimulation including twitches, tremors and mild convulsions at doses exceeding 127 mg/kg body weight, marked depression at doses generally from 0.400 to 40 mg/kg with autonomic activity evidenced by ptosis at 400 mg/kg and mydriasis at 0.400 mg/kg (suggesting anti-cholinergic activity) with two compounds. Hence, the compounds are useful in calming or sedating warm-blooded animals, such as mice, rats, etc. at doses between about 12.7 to 40 mg/kg body weight.

The in vivo anti-reserpine activity data was obtained, following the procedure of Rubin et al., *J. Pharm. and Exper. Therap.* 120:125, 1957, by administering each of the 1,4-benzodiazepine compounds, at 1 and 10 mg/kg body weight dose levels to groups of six mice (3 males and 3 females). One hour later the animals were challenged with reserpine, 2.5 mg/kg body weight, intraperitoneally. The degree of ptosis for each eye-lid was determined 1 hour after administration of reserpine. Control groups of animals are simultaneously run. The results obtained for the 1,4-benzodiazepines of Examples 2, 5, and 7, infra, were, expressed as the $ED_{50}$ needed to statistically reverse reserpine induced ptosis of the eye-lid in milligrams per kilogram host body weight, 2.8, 15.5, and 1.9, respectively.

EXAMPLE 1

2,3,6,7-Tetrahydro-3,3-dimethyl-6-phenyl-5H-imidazo[1,2-d][1,4]benzodiazepin-5-one 2-(o-aminophenyl)-5,5-(or 4,4-)-dimethyl-2-imidazoline (6.00 grams) in methylene chloride (140 milliliters) was added dropwise over a ½ hour period to a methylene chloride solution containing α-chlorophenylacetyl chloride (5.68 grams) with vigorous stirring. After stirring for an additional hour, the solution was washed with dilute aqueous hydrochloric acid, neutralized with aqueous sodium carbonate and extracted with methylene chloride. The solvent was stripped, the residue dissolved in methanol (150 milliliters) and the solution treated with triethylamine (10 milliliters). After standing for 3 days, the solvents were stripped and the title compound recovered as its hydrochloride salt (6.73 grams; melting range 243°–247°C.) contaminated with triethylamine hydrochloride. The product was converted to the free base by treatment with aqueous sodium bicarbonate, the triethylamine was removed and the purified free base was converted to the hydrochloride salt by treatment with isopropanolic HCl to afford 2.66 grams of product with a melting range above 360°C.

Following the procedure of the preceding paragraph while employing one half the quantities of reactants and allowing the reaction mixture to stand overnight, the seven membered ring was found to have spontaneously closed to afford the title compound as its hydrochloride salt. Recrystallization from alcohol gave 0.925 grams with a melting range over 320°C.

Elemental analysis for $C_{19}H_{20}ON_3Cl$ Calc'd: C, 66.66; H, 5.84; N, 12.28. Found: C, 66.60; H, 6.01; N, 12.21.

The mass spectral and infra-red data support the structure of the product.

EXAMPLE 2

2,5,6,7-Tetrahydro-3,3-dimethyl-6-phenyl-3H-imidazo [1,2-d][1,4]benzodiazepine.

The product of Example 1 (2.64 grams) was converted to the free base with aqueous sodium bicarbonate, isolated and refluxed with lithium aluminum hydride (0.350 gram) in tetrahydrofuran (75 milliliters) for 3 hours. The crude reduced product was isolated to afford 1.250 grams, melting range 178°–180°C. The hydrochloric acid addition salt was produced as in Example 1 and the product was recrystallized from methanol-isopropanol to give 1.125 grams, melting range greater than 320°C.

Elemental analysis for $C_{19}H_{22}N_3Cl$ Calc'd: C, 69.56; H, 6.76; N, 12.81. Found: C, 69.25; H, 6.77; N, 12.62.

The spectral data displayed no remains of the original carbonyl group.

EXAMPLE 3

2,3,6,7-Tetrahydro-6-phenyl-5H-imidazo [1,2-d][1,4] benzodiazepin-5-one.

2-(o-Aminophenyl)-2-imidazoline (3.22 grams) in methylene chloride (100 milliliters) was added to α-chlorophenylacetyl chloride (3.78 grams) in methylene chloride (200 milliliters) dropwise and the suspension was allowed to stand overnight. Filtration of the suspension afforded 4.92 grams, melting range 168°–172°C. with solidification and remelting at 215°–220°C. (decomp.) of the hydrochloride of the intermediate open amide. Allowing 3.7 grams of the intermediate open amide hydrochloride to stand with triethylamine (10 milliliters) in methanol (40 milliliters) for 3 days provided the title compound as its hydrochloride salt contaminated with triethylamine hydrochloride. The free base was formed by treatment with sodium bicarbonate followed by azeotropic removal of the triethylamine, formation of the hydrochloride addition salt and recrystallization from isopropanol gave 2.35 grams of product presenting a melting range over 230°C.

Elemental analysis for $C_{17}H_{16}ON_3Cl$. Calc'd: C, 65.06; H, 5.14; N, 13.42. Found: C, 65.72; H, 5.26; N, 13.07.

The spectral data, both infra-red and nuclear magnetic resonance was consistent with the structure of the title compound.

EXAMPLE 4

9-Chloro-2,3,6,7-tetrahydro-6-phenyl-5H-imidazo [1,2-d][1,4]benzodiazepin-5-one.

2-(o-amino-p-chlorophenyl)-2-imidazoline (2.93 grams) in methylene chloride (70 milliliters) was added to α-chlorophenylacetyl chloride (2.84 grams) in methylene chloride (100 milliliters) dropwise over ½ hour to provide the substituted crude open amide (4.15 grams; melting range 284°–287°C.). Treatment with triethylamine (10 milliliters) in methanol (70 milliliters) for 3 days followed by routine workup provided the title compound in crude form. Dry-column chromatography on neutral alumina using methylene chloride followed by isolation of the product band provided, after treatment with isopropanolic HCl, the hydrochloride addition salt (1.73 grams; melting range 324°–326°C.). Mass and infra-red spectral analysis confirmed the identity of the product.

EXAMPLE 5

9-Chloro-2,5,6,7-tetrahydro-6-phenyl-3H-imidazo[1,2-d][1,4]benzodiazepine

The product of Example 4 was treated with lithium aluminum hydride in tetrahydrofuran under conditions presented in Example 2 to afford the title compound, melting range 220°–223°C.

Elemental analysis for $C_{17}H_6N_3Cl$. Calculated: C, 68.51; H, 5.41; N, 14.10. Found: C, 68.13; H, 5.44; N, 14.14. Chemical ionization $= m + 1 = 298$.

EXAMPLE 6

10-Chloro-2,3,6,7-tetrahydro-6-phenyl-5H-imidazo-[1,2-d][1,4]benzodiazepin-5-one 2-(2-amino-5-chlorophenyl)-2-imidazoline (5.5 grams) in methylene chloride (150 milliliters) was added dropwise to α-chlorophenylacetyl chloride (6.426 grams) in methylene chloride (300 milliliters). The intermediate open amide was recovered in an amount of 7.85 grams; melting range 190°–195°C. (sinter), 283°–285°C. (decomp.). Treatment of the open amide with triethylamine (15 milliliters in methanol (150 milliliters) for a 3 day period followed by evaporation to dryness and partition between aqueous $NaHCO_3$ and methylene chloride and evaporation of liquid provided the title compound (5.40 grams; melting range 178°–182°C.

Elemental Analysis for $C_{17}H_{14}ON_3Cl$. Calc'd: C, 65.43; H, 4.52; N, 13.46. Found: C, 64.90; H, 4.73; N, 13.71.

The procedure of the preceding paragraph was repeated to give the same product, in somewhat purer form, melting range 196°–198°C.

EXAMPLE 7

10-Chloro-2,5,6,7-tetrahydro-6-phenyl-3H-imidazo [1,2-d][1,4]benzodiazepine.

A portion of the product of Example 6 (5.40 grams) was subjected to reduction with $LiAlH_4$ (0.800 grams) in tetrahydrofuran (200 milliliters) under reflux for 4–5 hours. The title compound was isolated and converted to its hydrochloric acid salt with isopropanolic HCl to afford 2.02 grams of the salt, melting range 298°–300°C. Recrystallization from isopropanol-methanol gave 1.50 grams, melting range 308°–310°C.

Elemental analysis for $C_{17}H_{17}N_3Cl_2$. Calc'd: C, 61.13; H, 5.13; N, 12.58. Found: C, 60.91; H, 5.11; N, 12.59.

The mass and infra-red spectral data confirmed the structure of the title compound.

What is claimed is:

1. A compound of the formula:

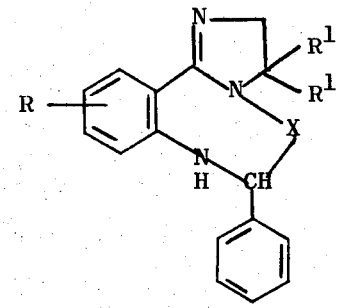

in which

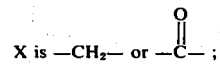

$X$ is $-CH_2-$ or $-\overset{O}{\underset{\|}{C}}-$ ;

$R$ is $-H$ or $-Cl$;
$R^1$ is $-H$ or $-CH_3$; and
pharmaceutically acceptable acid addition salts thereof.

2. The compound of claim 1 which is 2,3,6,7-tetrahydro-3,3- dimethyl-6-phenyl-5H-imidazo benzodiazepin-5-one and pharmaceutically acceptable acid addition salts thereof.

3. The compound of claim 1 which is 2,5,6,7-tetrahydro-3,3-dimethyl-6-phenyl-3H -imidazo benzodaizepine and phrarmaceutically acceptable acid addition salts thereof.

4. The compound of claim 1 which is 2,3,6,7-tetrahydro-6-phenyl-5H-imidazo benzodiazepin-5-one and the pharmaceutically acceptable acid addition salts thereof.

5. The compound of claim 1 which is 9-chloro-2,3,6,7-tetrahydro-6-phenyl-5H-imidazo benzodiazepin-5-one and pharmaceutically acceptable acid addition salts thereof.

6. The compound of claim 1 which is 9-chloro-2,5,6,7-tetrahydro 6-phenyl-3H-imidazo benzodiazepine and pharmaceutically acceptable acid addition salts thereof.

7. The compound of claim 1 which is 10-chloro-2,3,6,7-tetrahydro -6-phenyl-5H -imidazo benzodiazepin-5-one and pharmaceutically acceptable acid addition salts thereof.

8. The compound of claim 1 which is 10-chloro-2,5,6,7-tetrahydro-6-phenyl-3H imidazo benzodiazepine and pharmaceutically acceptable acid addition salts thereof.

* * * * *